United States Patent
Banyi et al.

(10) Patent No.: US 9,382,722 B2
(45) Date of Patent: Jul. 5, 2016

(54) ANTI-THEFT ASSEMBLY FOR INHIBITING THEFT OF CABLE FROM LIGHT POLES

(71) Applicant: Valmont West Coast Engineering Ltd., Delta (CA)

(72) Inventors: Zoltan Banyi, Ladner (CA); Ted Brockman, Ladner (CA); Ioan Giosan, Ladner (CA)

(73) Assignee: Valmont West Coast Engineering Ltd., Delta (CA)

( * ) Notice: Subject to any disclaimer, the term of this patent is extended or adjusted under 35 U.S.C. 154(b) by 286 days.

(21) Appl. No.: 13/951,204

(22) Filed: Jul. 25, 2013

(65) Prior Publication Data

US 2015/0027174 A1    Jan. 29, 2015

(51) Int. Cl.
*E05B 73/00* (2006.01)
*E04H 12/22* (2006.01)

(52) U.S. Cl.
CPC ........ *E04H 12/2284* (2013.01); *E04H 12/2292* (2013.01); *Y10T 70/50* (2015.04)

(58) Field of Classification Search
CPC .................................................. E05B 73/0017
USPC ................. 174/54 R; 70/57; 52/98, 296, 297, 52/651.07; 248/548
See application file for complete search history.

(56) References Cited

U.S. PATENT DOCUMENTS

| | | | |
|---|---|---|---|
| 3,343,322 A | 9/1967 | Lurkis et al. | |
| 3,596,141 A | 7/1971 | Jones et al. | |
| 3,760,234 A | 9/1973 | Jones et al. | |
| 3,837,752 A * | 9/1974 | Shewchuk | 403/2 |
| 3,988,870 A | 11/1976 | Snavely | |
| 4,733,020 A | 3/1988 | Elzy | |
| 4,812,958 A | 3/1989 | Rolfe et al. | |
| 5,216,203 A | 6/1993 | Gower | |
| 5,524,411 A | 6/1996 | Crossman | |
| 5,596,845 A * | 1/1997 | Strizki | 52/98 |
| 6,327,833 B1 | 12/2001 | Miskelley et al. | |
| 6,868,641 B2 * | 3/2005 | Conner et al. | 52/98 |
| 7,723,612 B2 * | 5/2010 | Butler | 174/45 R |
| 7,884,283 B1 | 2/2011 | Ousley | |
| 8,393,343 B2 * | 3/2013 | VanVonderen | 135/98 |
| 8,704,089 B2 * | 4/2014 | Atchley | 174/45 R |
| 2004/0037084 A1 | 2/2004 | Ginsburg | |
| 2005/0285011 A1 | 12/2005 | Harwood | |

(Continued)

FOREIGN PATENT DOCUMENTS

CA    2778677    11/2013

*Primary Examiner* — William H Mayo, III
*Assistant Examiner* — Hiram E Gonzalez
(74) *Attorney, Agent, or Firm* — Cameron IP

(57) ABSTRACT

There is provided, in combination, a mounting assembly for an upright pole through which at least one cable extends and an anti-theft assembly for inhibiting theft of the cable. The pole has a bottom and is supported by a foundation. The mounting assembly includes a plurality of spaced-apart couplers each having a top end configured to connect to the bottom of the pole, a bottom end configured to connect to the foundation and a breakaway point between the top and bottom ends of the couplers. The breakaway points cause the couplers to fail when the pole is impacted by a vehicle. The anti-theft assembly includes an inner sleeve shaped to extend about the cable. The sleeve is robust and tamper-resistant. The sleeve is positioned between the bottom of the pole and the foundation. According to one aspect, the sleeve has an upper end that connects to the bottom of the pole and a lower end that is spaced-apart from the foundation.

19 Claims, 18 Drawing Sheets

(56) References Cited

U.S. PATENT DOCUMENTS

| | | |
|---|---|---|
| 2006/0254794 A1 | 11/2006 | Burke et al. |
| 2007/0022706 A1 | 2/2007 | Fournier |
| 2008/0289870 A1 | 11/2008 | Butler |
| 2009/0095500 A1 | 4/2009 | Ygnelzi et al. |
| 2009/0301777 A1 | 12/2009 | Yribarren |
| 2011/0095162 A1* | 4/2011 | Parduhn et al. ............... 248/519 |
| 2012/0230004 A1 | 9/2012 | Atchley |
| 2013/0333939 A1* | 12/2013 | Butler ........................ 174/45 R |

* cited by examiner

ANTI-THEFT ASSEMBLY FOR INHIBITING THEFT OF CABLE FROM LIGHT POLES

FIELD OF THE INVENTION

There is provided an anti-theft assembly. In particular, there is provided an anti-theft assembly for inhibiting theft of cable from light poles.

DESCRIPTION OF THE RELATED ART

It is known to provide a mounting assembly for mounting a light pole to a foundation where the light pole is connected to the foundation via a plurality of breakaway couplers. The couplers are fixedly connectable to the bottom of the light pole, are fixedly connectable to the foundation, and include breakaway points. The breakaway points break off upon being subjected to a minimum pre-determined load so as to promote shear failure of the couplers when a vehicle impacts the base of the light pole. A frangible outer shell extends around the couplers. The shell is typically made of light-gauge aluminium. Electrical cables extend through the light pole.

The above system is vulnerable to theft. The thief simply breaks or cuts away the outer shell to access the cable therewithin. The cable extends between adjacent light poles. When the cable is cut at two points near adjacent light poles, the cable therebetween may be pulled out, coiled and sold at scrap metal dealers.

There is accordingly a need for an anti-theft assembly which overcomes the above problem in a cost-effective manner and which is easy to install without compromising the functionality of the breakaway couplers and their associated safety benefits.

BRIEF SUMMARY OF INVENTION

There is provided an anti-theft assembly disclosed herein that overcomes the above disadvantages.

There is accordingly provided, in combination, a mounting assembly for an upright pole through which at least one cable extends and an anti-theft assembly for inhibiting theft of the cable. The pole has a bottom and is supported by a foundation. The mounting assembly includes a plurality of spaced-apart couplers each having a top end configured to connect to the bottom of the pole, a bottom end configured to connect to the foundation and a breakaway point between the top and bottom ends of the couplers. The breakaway points cause the couplers to fail when the pole is impacted by a vehicle. The anti-theft assembly includes an inner sleeve shaped to extend about the cable. The sleeve is robust and tamper-resistant. The sleeve is positioned between the bottom of the pole and the foundation.

There is also provided an anti-theft assembly for an upright pole. The pole mounts to a foundation via a plurality of breakaway couplers. The pole is hollow, has a bottom and has at least one cable extending therethrough. The anti-theft assembly includes a sleeve extending about the cable. The sleeve is robust and tamper-resistant. The sleeve is positioned between the bottom of the pole and the foundation and is spaced-apart from the foundation.

There is further provided, in combination, a mounting assembly means for mounting an upright pole to a foundation, the pole being hollow and having a cable extending therethrough, and an anti-theft means for inhibiting access to and theft of the cable. The anti-theft means extends about the cable and is interposed between the pole and the foundation.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
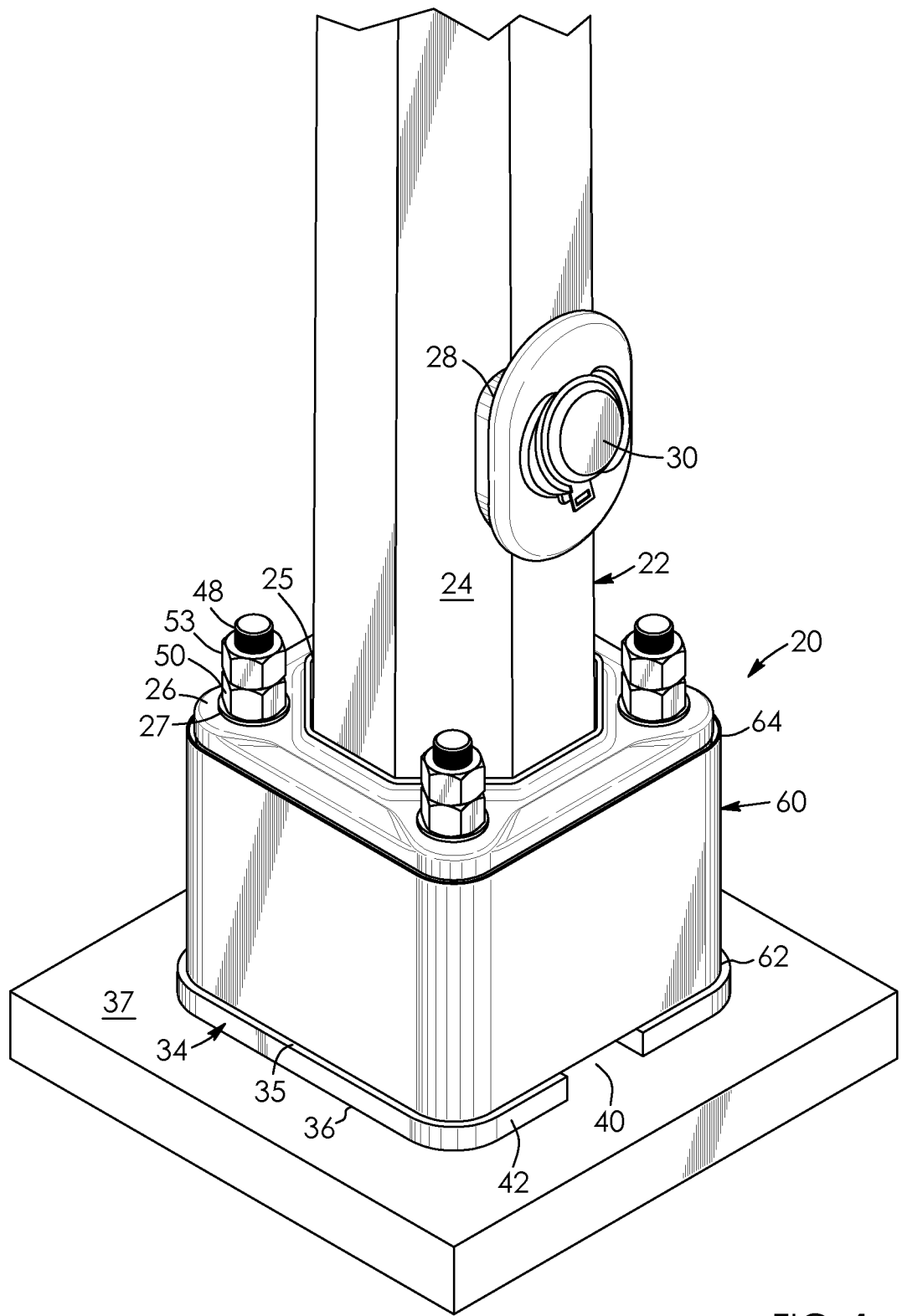
FIG. 1 is a top, side perspective view of a mounting assembly for a light pole in combination with an anti-theft assembly for the light pole according to a first aspect, the mounting assembly including an outer shell.

Referring to the drawings and first to FIG. 1, there is shown a mounting assembly 20 for an upright pole, in this example a light pole 22. The pole may be part of a streetlight or a traffic light, for example. The light pole 22 is generally octagonal in cross-section in this example. The light pole includes a hollow tubular body portion 24, a top (not shown), and a bottom 25 which is spaced-apart from its top. The light pole 22 includes a flange 26 at its bottom with a plurality of spaced-apart apertures, as shown by aperture 27 extending through the flange. The flange is generally rectangular in shape in this example. The light pole has an access opening 28 positioned adjacent to the bottom 25 and a tamper-proof access door 30 shaped to selectively cover the opening. A plurality of cables, as seen by cable 32 in FIG. 2, extend through the light pole and typically connect to adjacent poles for providing electricity to the poles' lights (not shown). The cables extend through conduits 31 which have distal ends 33. The conduits are tubular and made of PVC in this example, though this is not strictly required.

Figure 6:
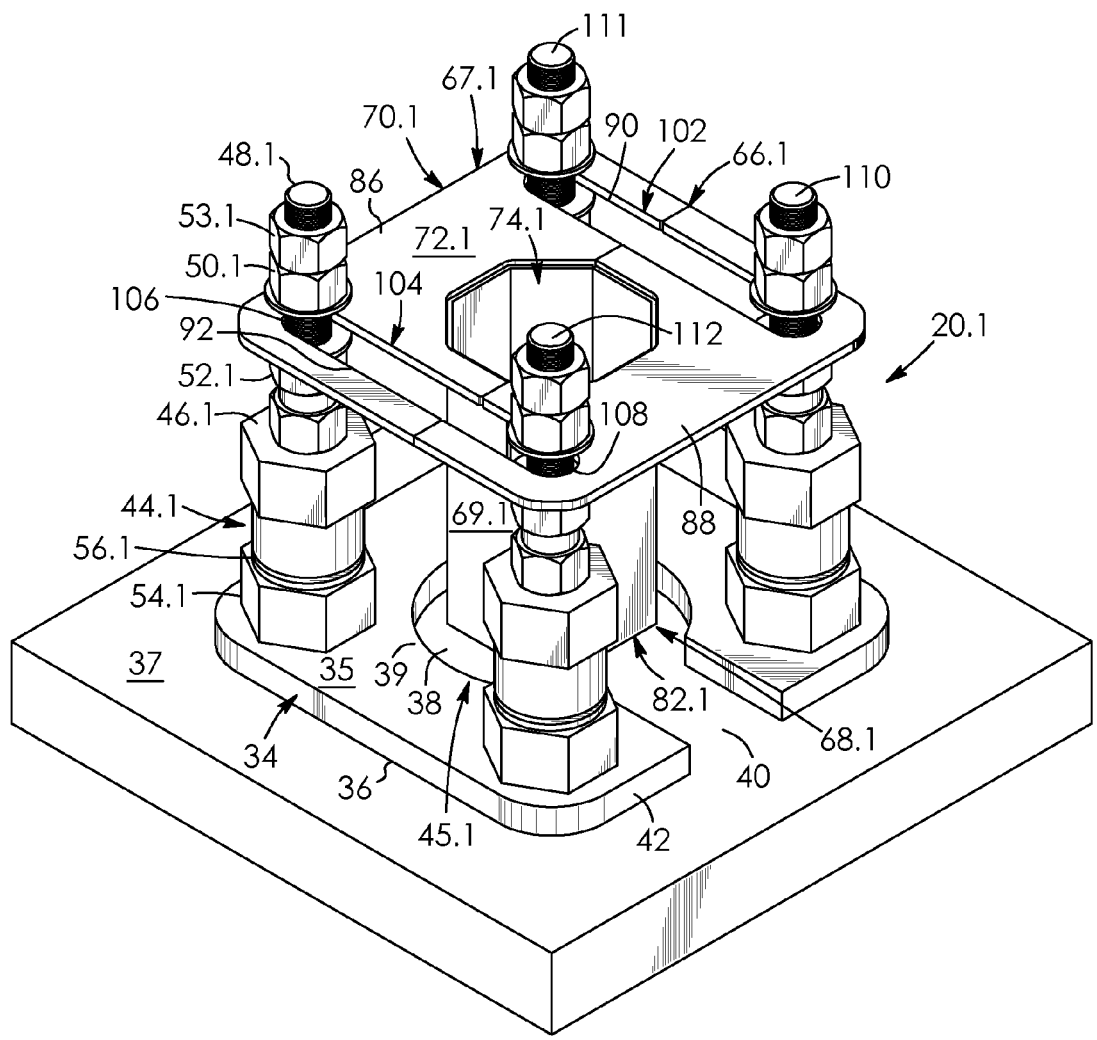
FIG. 6 is a top, side perspective view of the combination of FIG. 5, with the outer shell removed and showing a plurality of breakaway couplers operatively connected to the light pole, there also being shown a base plate and an inner sleeve positioned between the couplers, the sleeve comprising two split halves or parts.

Referring back to FIG. 1, the mounting assembly 20 includes a base plate 34 that is generally flat and square in this example. The base plate includes a top 35 facing the light pole 22 and a bottom 36 opposite thereof. The bottom of the base plate 34 abuts a foundation 37 that is generally flat in this example. As seen in FIG. 6, the base plate 34 has a central aperture 38 and a slotted portion 40 that extends from the aperture to side 42 of the base plate. The slotted portion of the base plate enables the plate to be installed or slid under an existing, already-installed light pole without requiring the light pole to be re-wired in the process.

Figure 2:
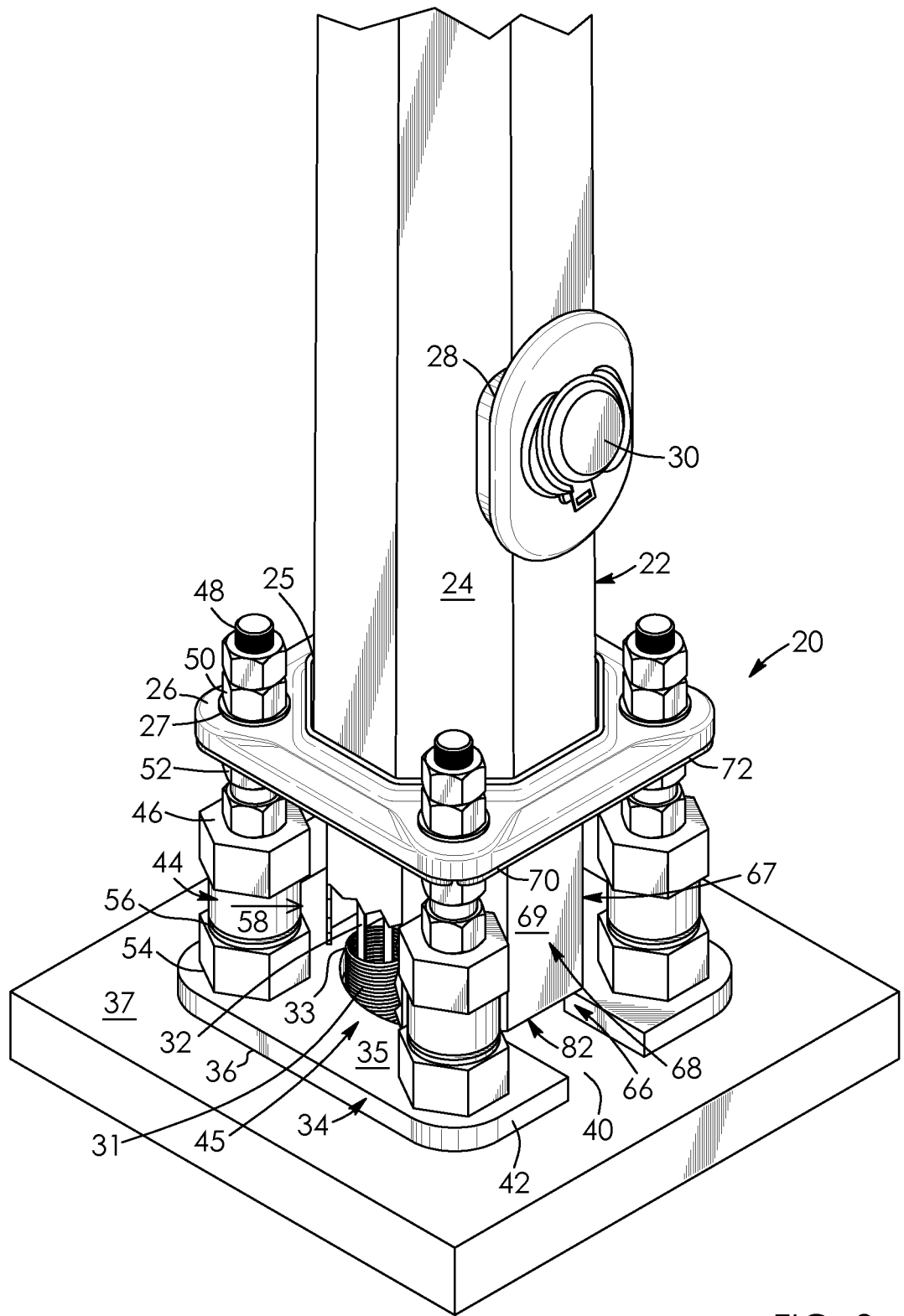
FIG. 2 is a top, side perspective view of the combination of FIG. 1, with the outer shell removed and showing a plurality of breakaway couplers operatively connected to the light pole, there also being shown a base plate and an inner sleeve positioned between the couplers, the inner sleeve being shown partially in fragment to reveal cable extending therethrough.

As seen in FIG. 2, the mounting assembly 20 includes a plurality of breakaway couplers, in this example four couplers as shown by coupler 44. The couplers 44 extend around an inner space 45. Each coupler has a top end 46 configured to fixedly, operatively connect to flange 26 of the light pole 22. The mounting assembly 20 includes a plurality of connecting members, in this example male threaded members 48 arranged to pass through apertures 27 of the flange 26 and threadably engage with corresponding female threads at the top ends 46 of the couplers 44. Nuts 50 and 52 on opposite sides of the flange 26 hold the flange in place relative to the couplers. The threaded members 48 thus connect the top ends 46 of the couplers 44 to the light pole 22. Further nuts 53 may abut nuts 50 to inhibit nuts 50 from loosening.

Each coupler 44 has a bottom end 54 configured to abut base plate 34. The base plate is thus interposed between the foundation 37 and the bottom ends of the couplers 44. Each of the bottom ends 54 of the couplers fixedly, operatively connects to the foundation 37 in this example via anchor bolts (not shown), which engage corresponding females apertures at the bottom ends of the couplers. Each coupler 44 has a breakaway point, in this example an annular slit or cut portion 56 between the top end 46 and bottom end 54 of the coupler. The slotted portions promote failure of the couplers in shear when impacted by a vehicle, for example, and as shown by arrow 58 in FIG. 2. The couplers are designed to break at cut portions 56 when the couplers are subjected to a predetermined break load.

As seen in FIG. 1, the mounting assembly 20 includes an outer shell 60 that extends around the couplers 44. The shell is four sided and is generally rectangular in cross-section in this example. The shell is frangible, being designed to breakaway when a vehicle impacts the mounting assembly 20. The shell 60 has an open, first end 62 abutting base plate 34 and an open, second end 64 spaced-apart from end 62. End 64 is positioned adjacent to the flange 26 of the light pole 22. Mounting assembly 20 may be collectively referred to as a mounting assembly means.

Figure 4:
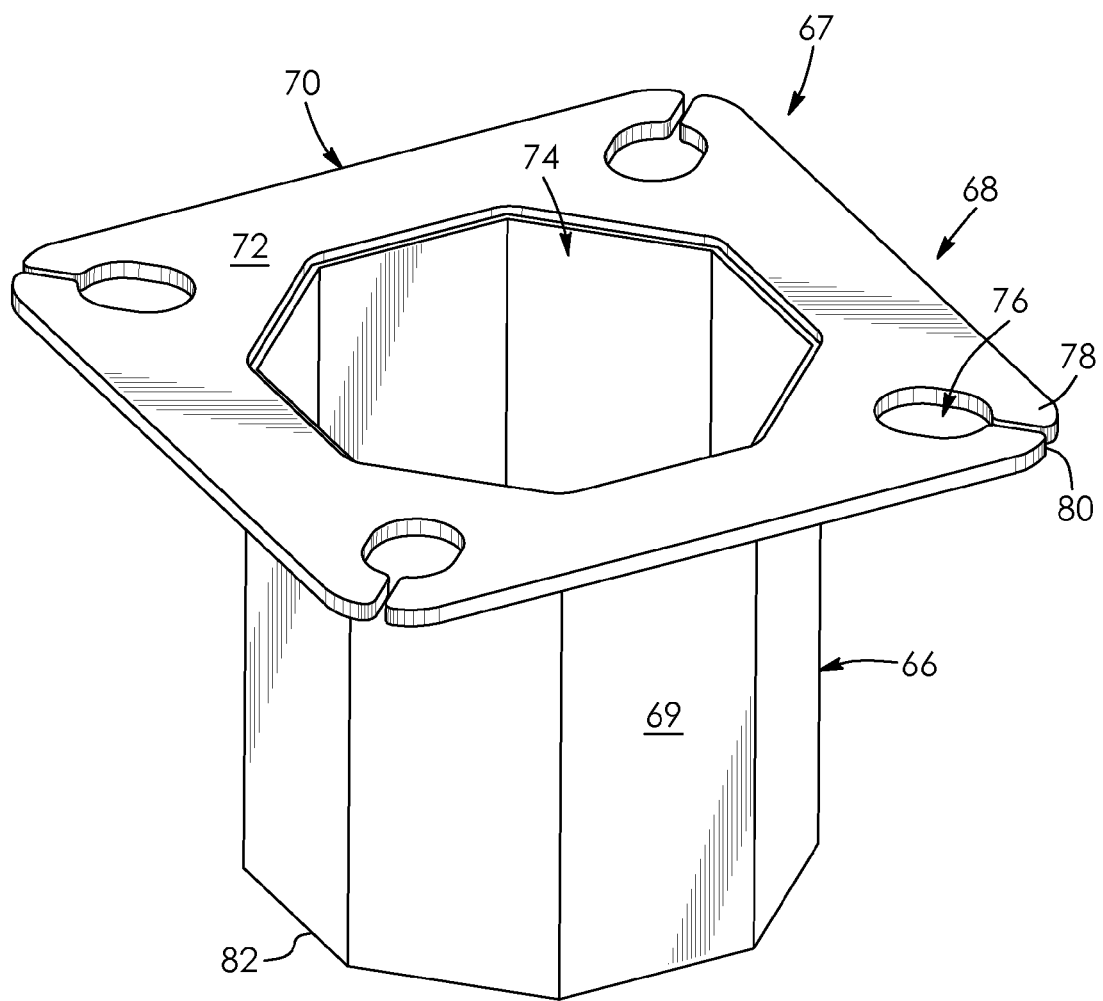
FIG. 4 is a top, side perspective view of the sleeve of FIG. 2.
Figure 5:
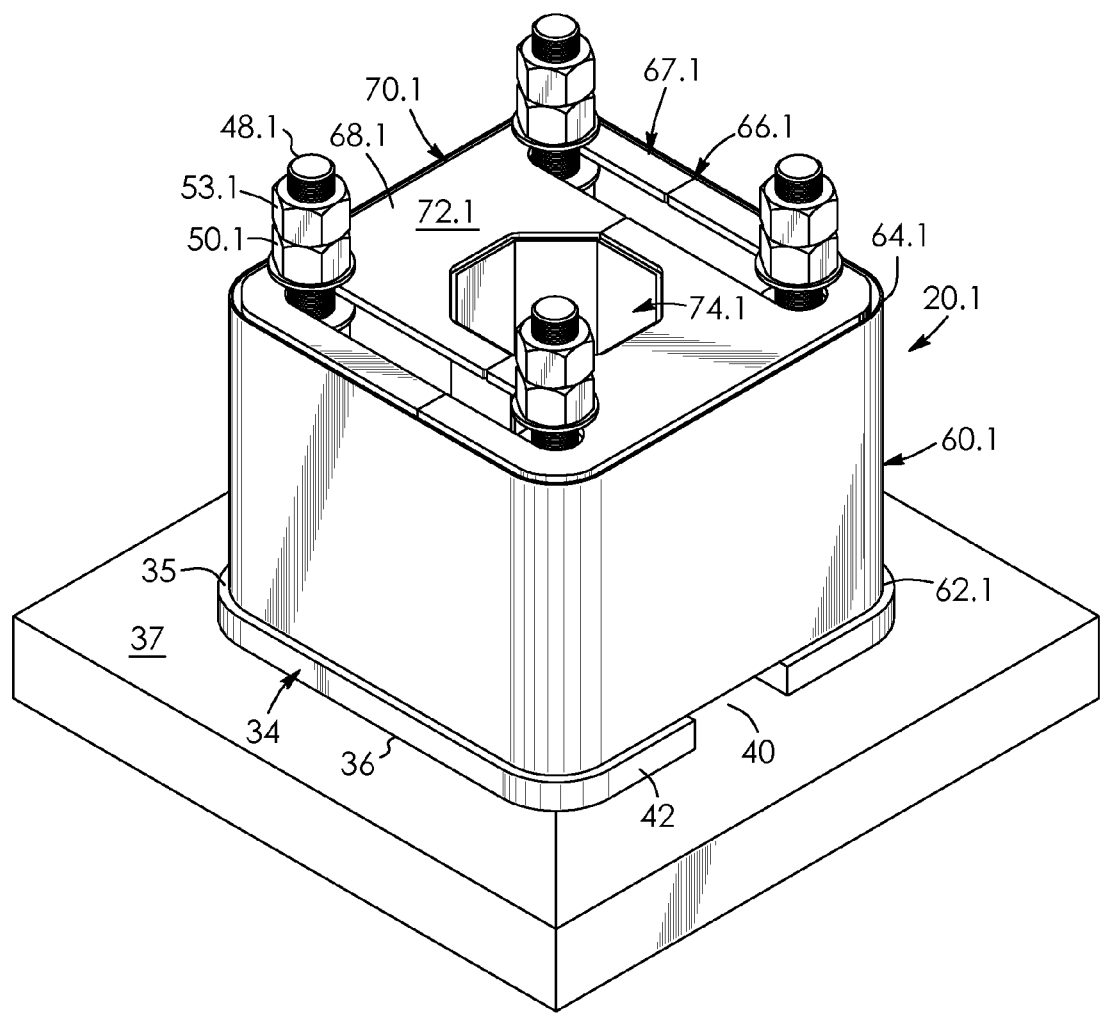
FIG. 5 is a top, side perspective view of a mounting assembly for a light pole in combination with an anti-theft assembly for the light pole according to a second aspect, the assembly including an outer shell.

Referring now to FIG. 2, there is further provided an anti-theft assembly 66. The anti-theft assembly comprises a sleeve assembly 67 which includes one inner, upper sleeve 68 in this example or a plurality of sleeves as in other examples described below. Sleeve 68 is configured to extend around the cable 32. The sleeve 68 in this embodiment is preferably used in new installations and where wiring or re-wiring of light poles is possible. The sleeve is robust and tamper-resistant, in this example being made of steel. The sleeve 68 is octagonal in cross-section in this example and includes a series of longitudinal sides, as shown by side 69. Sleeve 68 is located in space 45 located inwardly between the couplers 44 and is thus interposed between the couplers 44. The sleeve has an open, upper end 70, best seen in FIG. 4. The sleeve 68 includes a flange 72 at its upper end which abuts flange 26 of light pole 22 in this example. As seen in FIG. 4, the flange is generally rectangular in shape and includes a central aperture 74 that is octagonal in shape in this example. The flange 72 has a plurality of corners with a plurality of apertures extending through the flange at locations adjacent to the corners, as shown by aperture 76 at corner 78. The flange 72 has a plurality of slots, as shown by slot 80, which extend between respective ones of the apertures 76 and corners 78.

Flange 72, including its apertures 76, is preferably formed by way of plasma, laser or flame-cutting, for example. The reflected flame/light that arises when piercing through the base material of the flange may overheat the cutting torch-tip (not shown), particularly if every aperture is separately pierced. Flange 72 is therefore formed through cutting along a continuous burn path and slots 80 are created when cutting out the flange's apertures. Forming the flange 72 via a continuous burn path in this manner thus avoids the need to pierce the base material at every aperture 76 and may increase the longevity of torch-tips.

Figure 3:
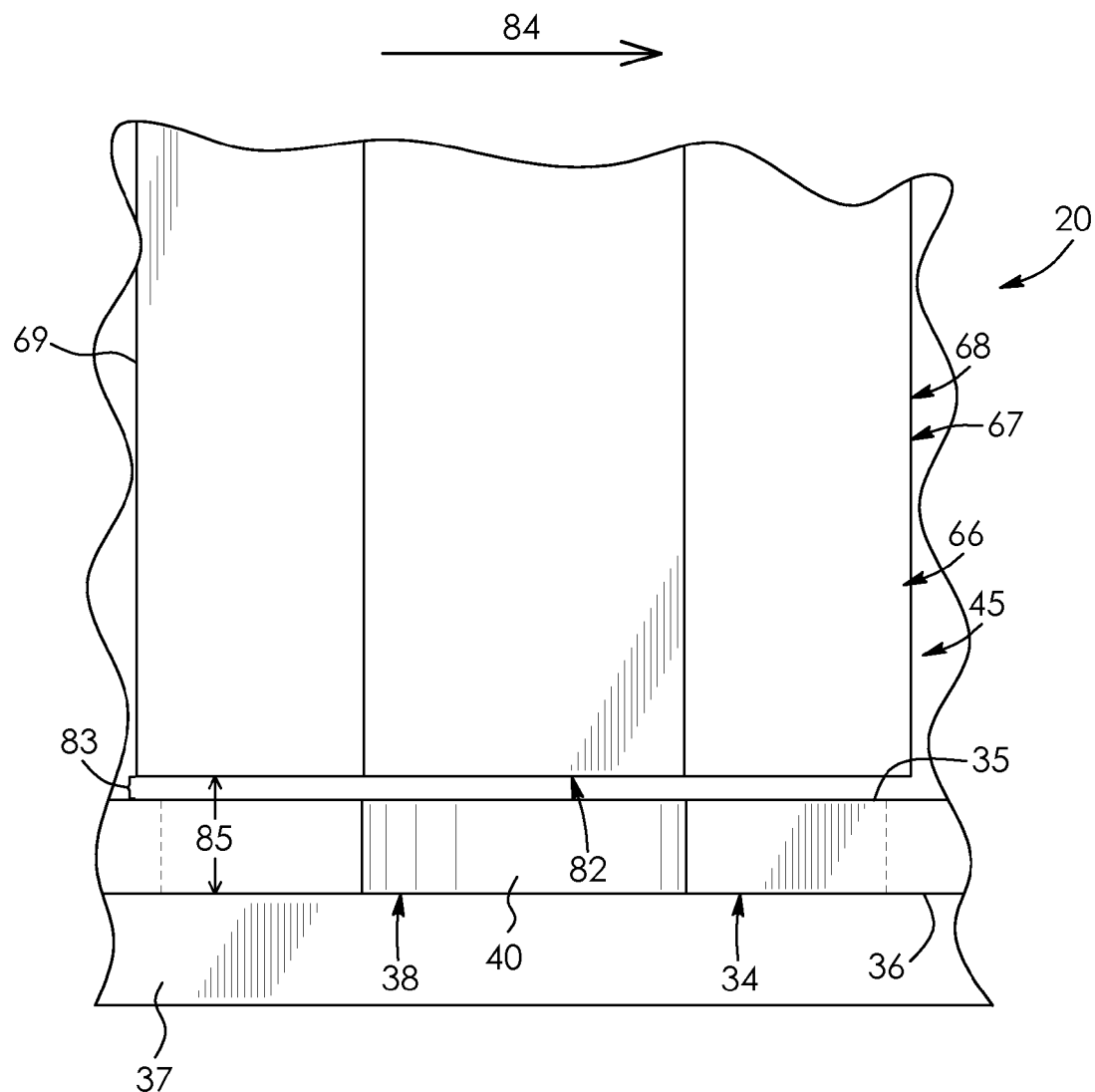
FIG. 3 is a side elevation view showing the sleeve of FIG. 2 in fragment and the base plate of FIG. 2 in fragment.

The threaded members 48 seen in FIG. 1 extend through respective apertures 76 of the flange 72 seen in FIG. 4. Nuts 50 and 52 seen in FIG. 2 thus threadably connect flanges 26 and 72 together and the sleeve 68 connects to the couplers 44. As seen in FIG. 2, the sleeve 68 thus fixedly connects to the bottom 25 of the light pole 22. Flange 72 therefore operatively connects to the top ends 46 of the couplers 44. As seen in FIG. 2, sleeve 68 is thus operatively connects to the couplers 44 at locations above the cut portions 56 of the couplers Referring to FIG. 4, the sleeve 68 has an open, lower end 82 which is spaced-apart from its upper end 70. As seen in FIG. 2, the sleeve is positioned between the bottom 25 of the light pole 22 and the foundation 37. In this case and as seen in FIG. 3, the lower end 82 of the sleeve 68 substantially aligns with and is coaxial with the central aperture 38 of the base plate 34. The sleeve 68 is shaped such that its lower end 82 is upwardly spaced-apart from and remains free from the top 35 of the base plate in this example, as seen in FIG. 3, so as to form a gap 85 between the lower end of the sleeve and the foundation 37. There is also a gap 83 between the lower end 82 of the sleeve and the base plate 34 in this example. Thus, sleeve 68 functions to fully extend around cables 32 in a robust and tamper-free manner to protect them thereby while, at the same time, being configured to readily move in a transverse direction, as shown by arrow 84, along with couplers 44 seen in FIG. 2 so as not to interfere with shearing of the couplers should a vehicle hit the mounting assembly 20.

FIGS. 5 to 8 show, in combination, a mounting assembly 20.1 and an anti-theft assembly 66.1 according to a second aspect. Like parts have like numbers and functions as the mounting assembly 20 and anti-assembly 66 shown in FIGS. 1 to 4 with the addition of "0.1". Assemblies 20.1 and 66.1 are substantially the same as assemblies 20 and 66 shown in FIGS. 1 to 4 with the following exceptions.

Figure 8:
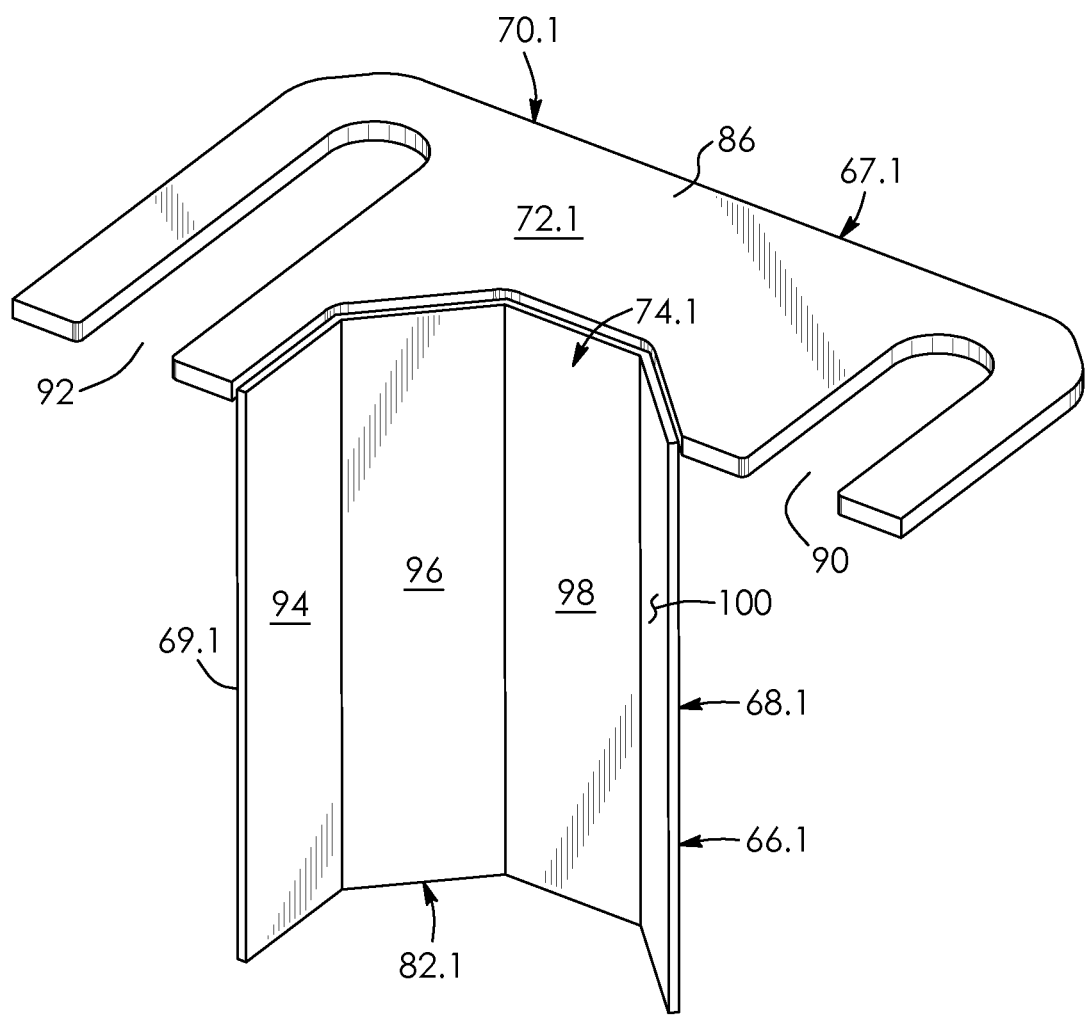
FIG. 8 is a top side perspective view of one of the parts of the sleeve of FIG. 6.
Figure 9:
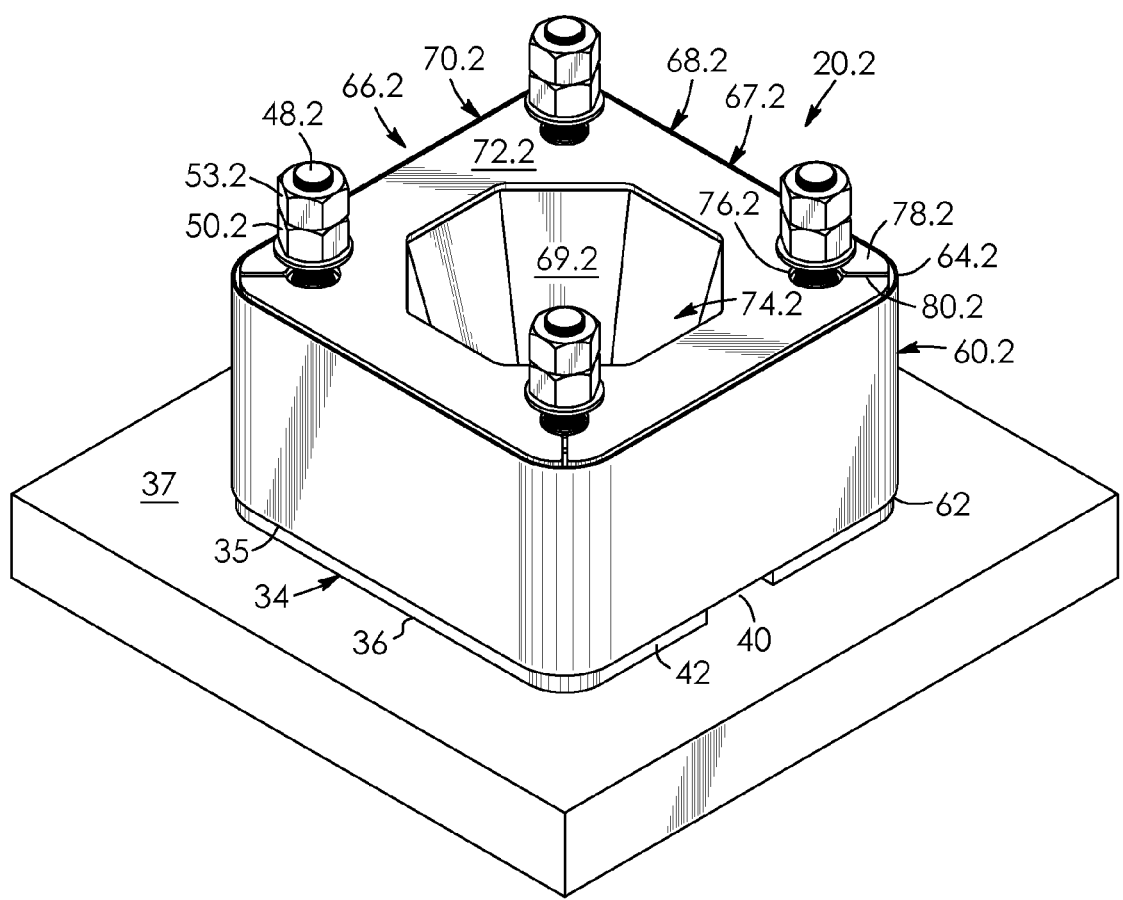
FIG. 9 is a top, side perspective view of a mounting assembly for a light pole in combination with an anti-theft assembly for the light pole according to a third aspect, the assembly including an outer shell.

As seen in FIG. 6, sleeve 68.1 is split and comprises two sleeve halves or parts 86 and 88, part 86 being shown in greater detail in FIG. 8. Each part has a pair of spaced-apart elongate recesses, as shown in this example by recesses 90 and 92 for part 86 of the sleeve. Each of the parts 86 and 88 has four elongate wall sections 94, 96, 98 and 100, each of which is connected to adjacent sections and angled relative thereto. The wall sections of each of the two parts of the sleeve when brought together enclose the cable and form a generally octagonal shape. Recess 92 is adjacent to wall section 94 and recess 90 is aligned adjacent to wall section 100. Recess 92 is longer than recess 90 by a distance equal to wall section 94 in this example.

As seen in FIG. 6, a pair of elongate slots 102 and 104 form when recesses 90 and 92 of respective ones of the parts 86 and 88 of the sleeve 68.1 connect together. Each slot has a pair of spaced-apart ends, as shown by ends 106 and 108 for slot 104. A first two of the threaded members, as generally shown by numerals 110 and 111, extend through slot 102 and a second two of the threaded members, as generally shown by numerals 48.1 and 112, extend through slot 104. Sleeve 68.1 operatively connects to the upper ends 46.1 of the couplers 44.1 thereby. Each threaded member abuts a respective one of the ends of the slots when the parts of the sleeve are brought together for enclosing around the cable, as shown by threaded members 48.1 and 112 abutting ends 106 and 108, respectively of slot 104.

Sleeve 68.1 as herein described may be particularly suited for existing installations where re-wiring of the light pole may not be possible or desired. The latter may be the case because re-wiring can increase costs, including the need for electrical inspections thereafter, for example. The two sleeve parts 86 and 88, seen in FIG. 6, slide in from the sides between the couplers 44.1 and around the wires. Also, sleeve 68.1 in its split form so shown may be installed without the whole of the light pole needing to be lifted upwards. In this case, by loosening each of the nuts 50.1 and 53.1 from the threaded members 48.1, 110, 111 and 112, the light pole may be selectively tilted. This may be performed using a small crane, for example. One of the halves or parts of the sleeve 68.1, such as part 86, may then be slid in place. The light pole may then be tilted in the opposite direction for the other half or part 88 of the sleeve to be slid in place. Recesses 90 and 92 of the respective ones of the parts 86 and 88 of the sleeve 68.1 enable the sleeve to be so positioned and slid in place.

Figure 7:
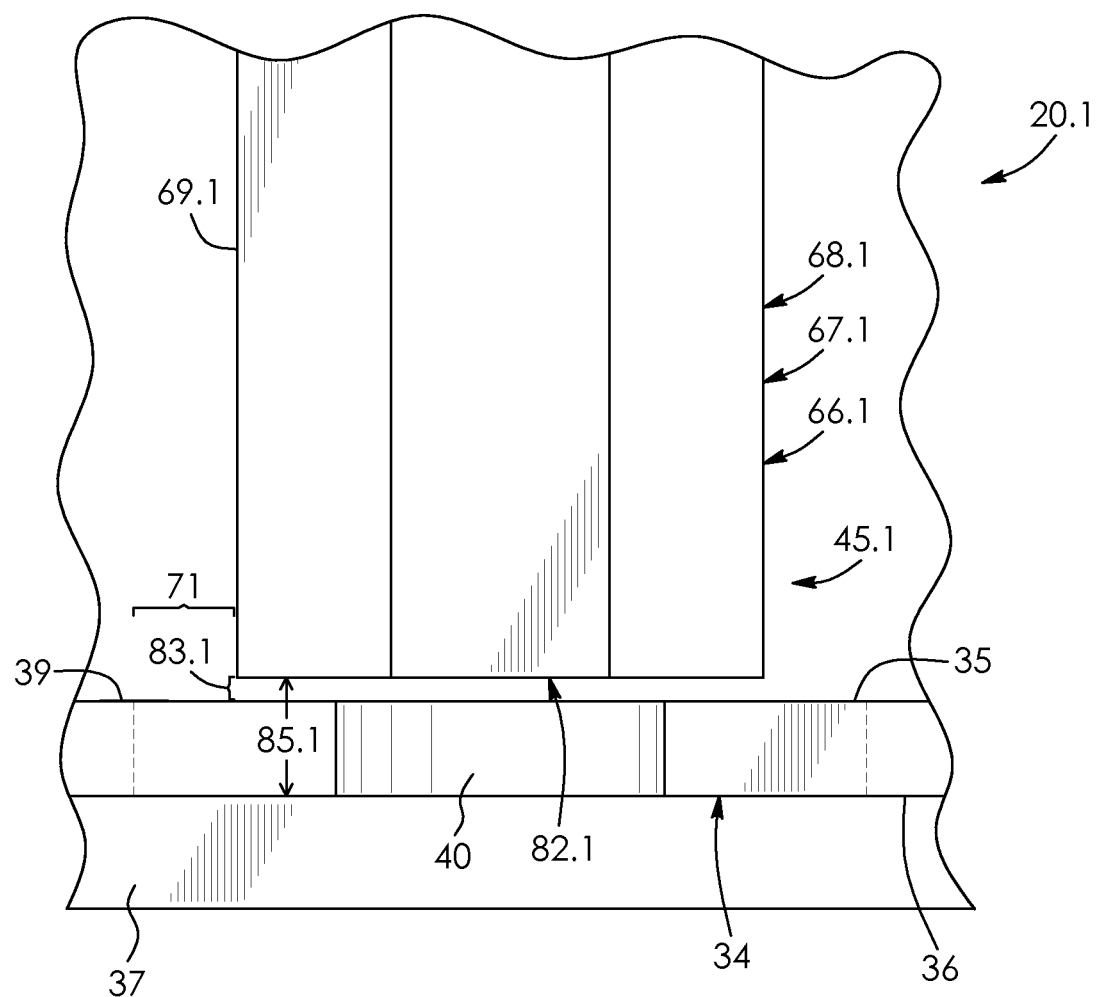
FIG. 7 is a side view showing the sleeve of FIG. 6 in fragment and the base plate of FIG. 6 in fragment.

Portions 39 of the base plate 34 adjacent to central aperture 38 of the base extend around the lower end 82.1 of the sleeve 68.1 in this example. A spacing, as shown by numeral 71, extending between and around the sleeve and base plate, is thus formed between the sides 69.1 of the sleeve and portions 39. As seen in FIG. 7, the lower end 82.1 of the sleeve is spaced-apart from the top 35 of the base plate by gap 83.1. This, together with lower end 82.1 being inwardly spaced-apart from portions 39, allows the sleeve to readily shear off when the light pole is impacted by a vehicle. In other embodiments, lower end 82.1 of the sleeve 68.1 may be partially positioned within aperture 38 of the base plate 34 while still remaining spaced-apart from and free of foundation 37. The sleeve so shaped thus functions to securely connect to the light pole at its top, extend around and protect the wires of the light pole and fail in shear should the light pole be hit by a car because it is spaced-apart from and free of the foundation.

FIGS. 9 to 13 show, in combination, a mounting assembly 20.2 and an anti-theft assembly 66.2 according to a third aspect. Like parts have like numbers and functions as the mounting assembly 20 and anti-assembly 66 shown in FIGS. 1 to 4 with the addition of "0.2". Assemblies 20.2 and 66.2 are substantially the same as assemblies 20 and 66 shown in FIGS. 1 to 4 with the following exceptions.

Figure 10:
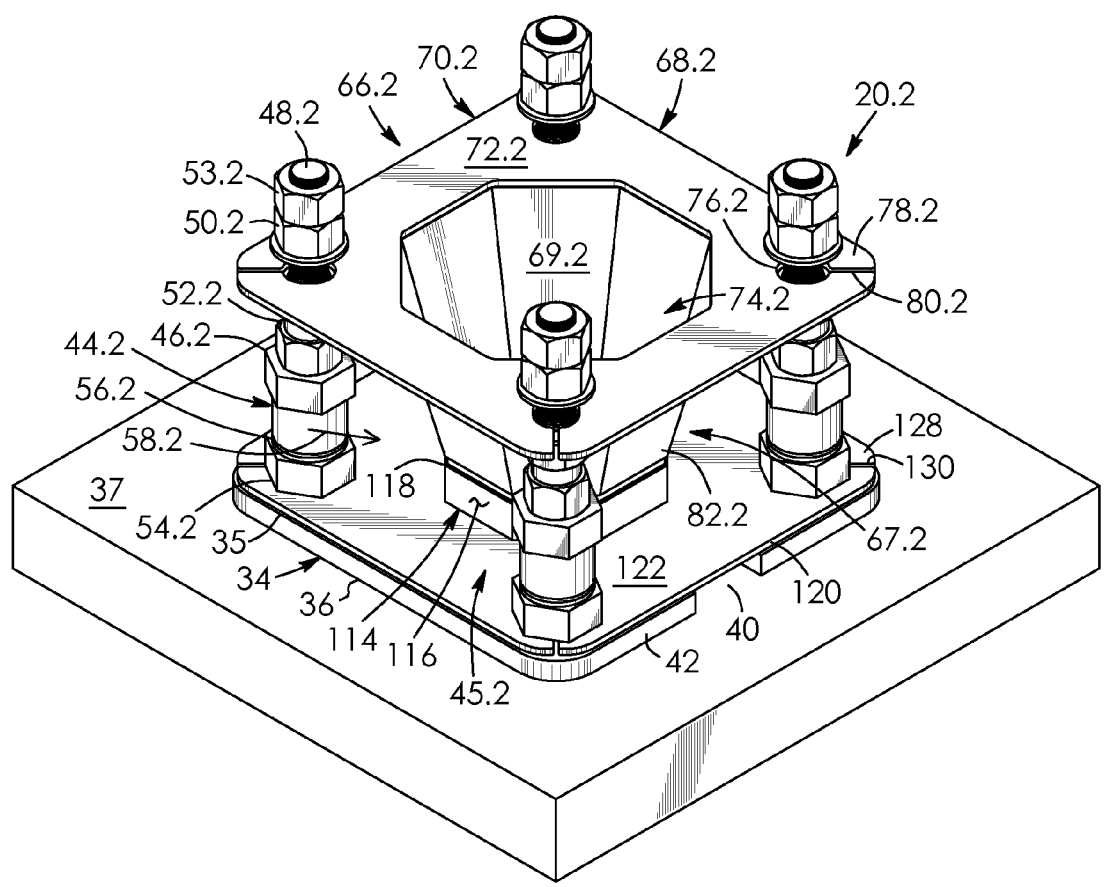
FIG. 10 is a top, side perspective view of the combination of FIG. 9, with the outer shell removed and showing a plurality of breakaway couplers operatively connected to the light pole, there also being shown a base plate and a sleeve assembly, the sleeve assembly including an inner, upper sleeve positioned between the couplers and an inner, lower sleeve positioned between the couplers.

In this example, sides 69.2 of sleeve 68.2 inwardly taper from the upper end 70.2 of the sleeve to the lower end 82.2 of the sleeve as seen in FIG. 10.

Figure 11:
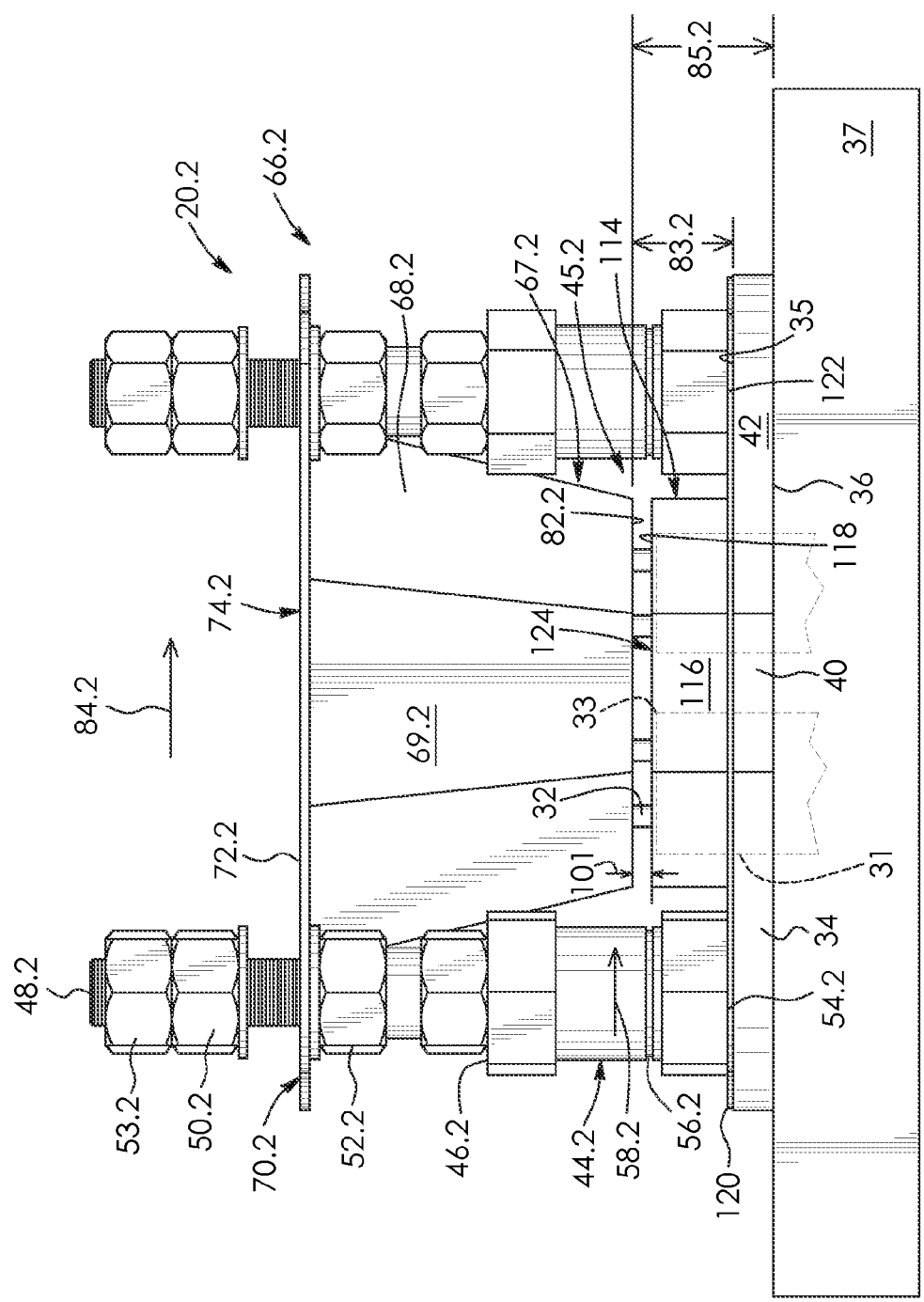
FIG. 11 is a side elevation view of the combination of FIG. 10, with the outer shell removed.
Figure 12:
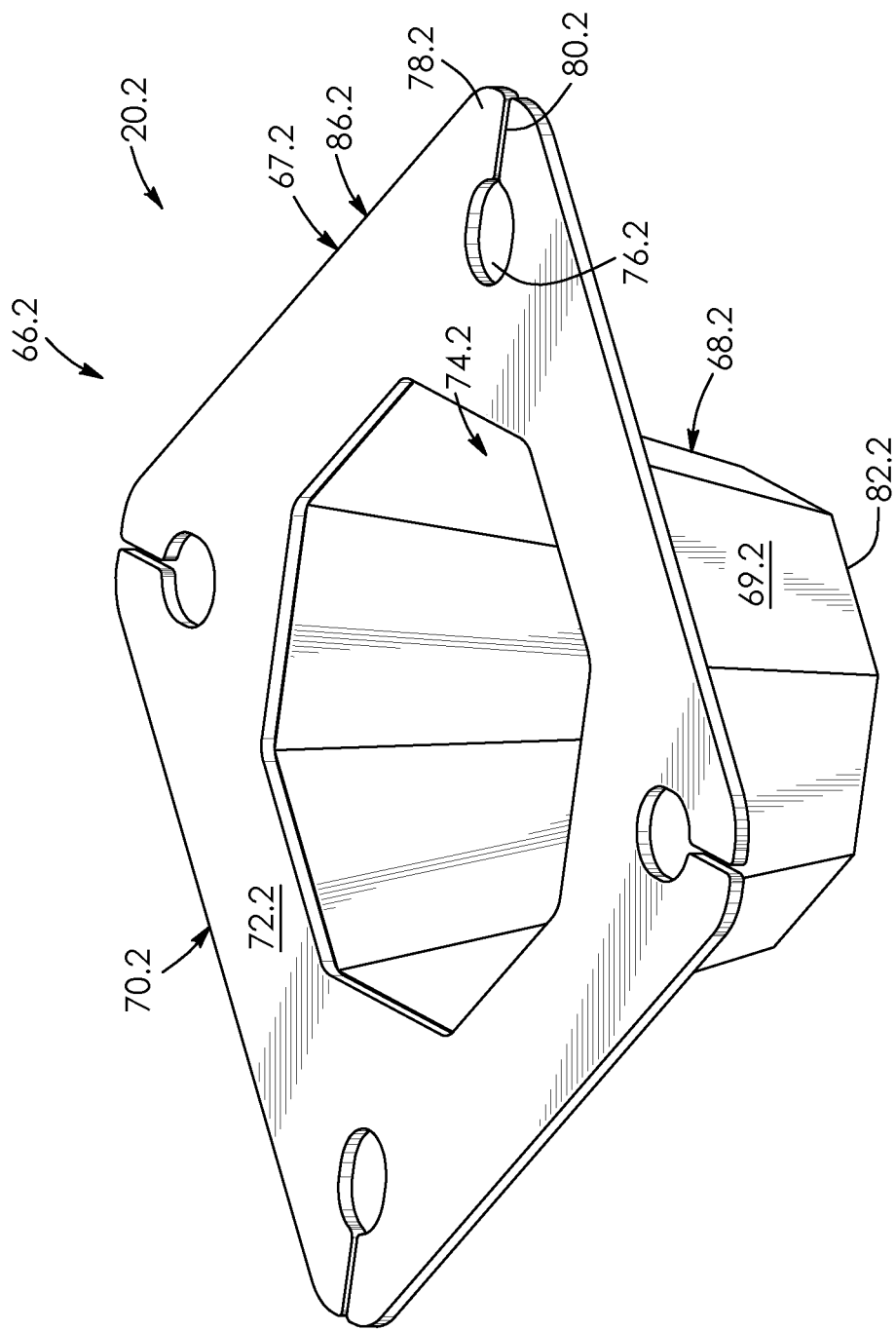
FIG. 12 is a top, side perspective view of the upper sleeve of FIG. 10.

Also, sleeve assembly 67.2 further includes an inner, lower sleeve 114 that is operatively connectable to the foundation. The lower sleeve is shaped to extend around the cables 32 as seen in FIG. 11. The sleeve 114 in this embodiment is preferably used in new installations and where wiring or re-wiring of light poles is possible. The sleeve is robust and tamper-resistant, in this example being made of steel. The sleeve 114 is octagonal in cross-section in this example and includes a series of longitudinal sides, as shown by side 116. As seen in FIG. 10, sleeve 114 is located in space 45.2 located inwardly between the couplers 44.2 and is thus interposed between the couplers.

Figure 13:
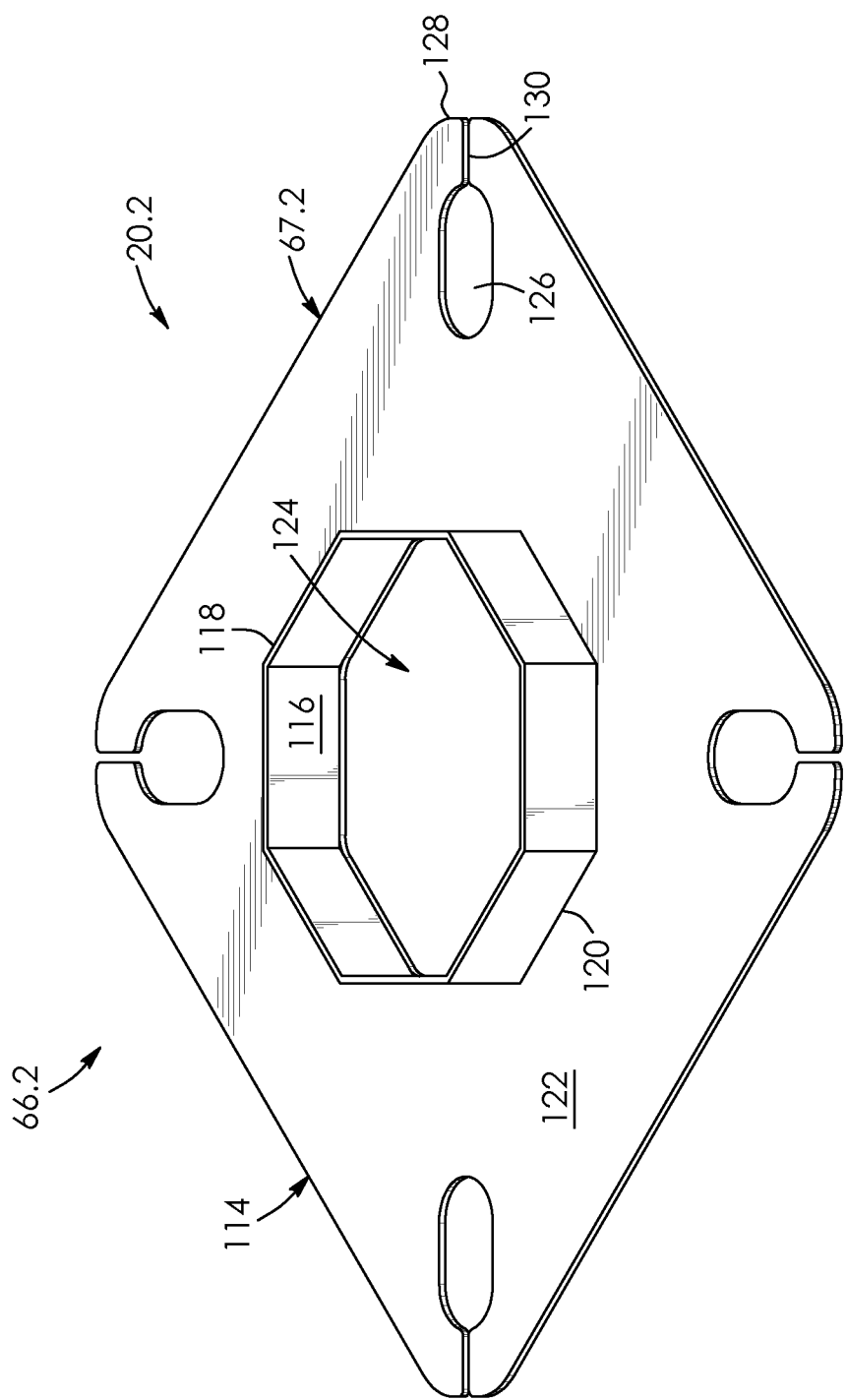
FIG. 13 is a top, side perspective view of the lower sleeve of FIG. 10.
Figure 14:
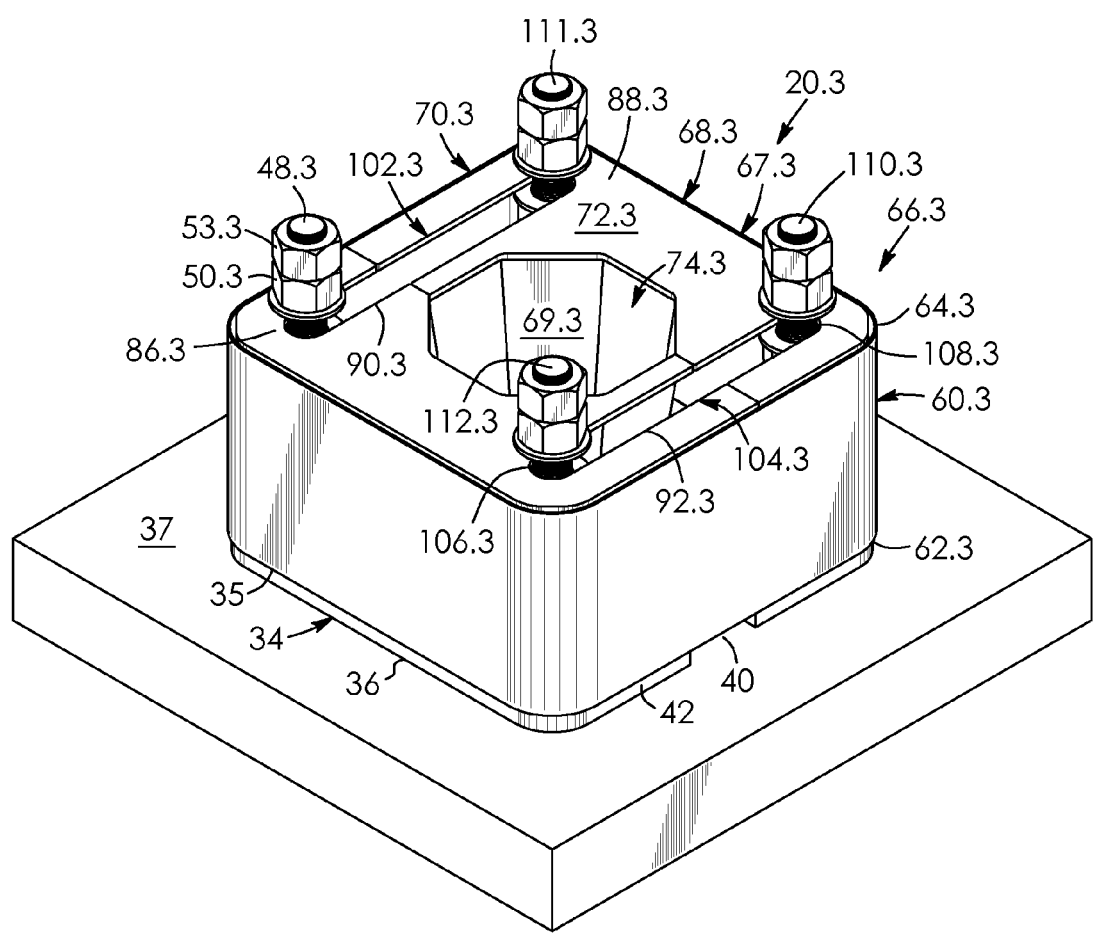
FIG. 14 is a top, side perspective view of a mounting assembly for a light pole in combination with an anti-theft assembly for the light pole according to a fourth aspect, the assembly including an outer shell.

The sleeve has an open, upper end 118 and an open, lower end 120 spaced-apart from its upper end, as best seen in FIG. 13. The sleeve 114 includes a flange 122 at its lower end which abuts top 35 of base plate 34 in this example, as seen in FIG. 11. Referring back to FIG. 13, the flange is generally rectangular in shape and includes a central aperture 124 that is octagonal in shape in this example. The flange 122 has a plurality of corners with a plurality of apertures extending through the flange at locations adjacent to the corners, as shown by aperture 126 at corner 128. The flange 72 has a plurality of slots, as shown by slot 130, which extend between respective ones of the apertures 126 and corners 128. Flange 122, including its apertures 126, is preferably formed by way of plasma, laser or flame-cutting, for example. Forming the flange via a continuous burn path in this manner thus avoids the need to pierce the base material at every aperture 126 and may increase the longevity of torch-tips.

The threaded members 48.2 seen in FIG. 10 extend through respective apertures 126 of the flange 122 seen in FIG. 13. Referring to FIG. 10, bottom ends 54.2 of the couplers 44.2 abut flange 122 in this example. The couplers in this example threadably connect flange 122, base plate 34 and foundation 37 together. The sleeve 114 thus fixedly connects to the foundation 37 in this example. Flange 122 therefore operatively connects to the bottom ends 54.2 of the couplers 44.2. Sleeve 114 thus operatively connects to the couplers 44.2 at locations below the cut portions 56.2 of the couplers. Sleeve 114 is positioned between the top 35 of the base plate 34 and the lower end 82.2 of the upper sleeve 68. In this case, the upper end 118 of the sleeve 114 substantially aligns with and is coaxial with the lower end 82.2 of sleeve 68.2.

Referring to FIG. 11, the upper end 118 of the sleeve 114 aligns with the cut portions 56.2 of the couplers 44.2 in this example. In other embodiments, upper end 118 of the sleeve 114 is below the cut portions of the couplers. Conduits 31 are shaped such that their distal ends 33 align with the cut portions 56.2 of the couplers 44.2. This may be achieved by trimming the conduits when installing the anti-theft assembly 20.2. Sleeve 114 thus fully extends around the otherwise exposed portions of the conduits 31 in a robust and tamper-free manner to protect the portions of the cable therewithin. At the same time, sleeve 114 remains at or below the cut portions 56.2 of the couplers 44.2 so as not to interfere with shearing of the couplers should a vehicle hit the mounting assembly 20.2.

As seen in FIG. 11, lower end 82.2 of sleeve 68.2 is positioned adjacent to and is axially spaced-apart above the cut portions 56.2, or shear level, of the couplers 44.2 by a gap or distance 101 which aligns and is co-planar with breakaway points 56.2. Distance 101 is equal to 10 millimeters in this example, though this is not strictly required and it may be other distances in other embodiments. As seen in FIG. 11, upper end 118 of lower sleeve 114 is adjacent to and is spaced-apart from lower end 82.2 of upper sleeve 68.2, the upper sleeve 68.2 thus being upwardly spaced-apart from the lower sleeve 114 as seen in FIG. 11. A space, equal in height to distance 101 in this example, is thus provided between the lower end of the upper sleeve and the upper end of the lower sleeve.

The sleeves are separated by distance 101 to allow for shearing of the couplers without any interference from the sleeves while also being sufficiently narrow to inhibit easy access to and thus theft of the cables 32. When pole such as pole 22 seen in FIG. 1, is impacted by a vehicle for example, causing the pole to rotate around its center of mass after shearing the couplers 44.2, sleeve 68.2 is so positioned to enable the pole to clear the bottom stubs of the sheared couplers.

FIGS. 14 to 18 show, in combination, a mounting assembly 20.3 and an anti-theft assembly 66.3 according to a fourth aspect. Like parts have like numbers and functions as the mounting assembly 20.2 and anti-assembly 66.2 shown in FIGS. 9 to 13 with the decimal extension "0.3" replacing decimal extension "0.2" and being added for numerals not previously having decimal extensions. Assemblies 20.3 and 66.3 are substantially the same as assemblies 20.2 and 66.2 shown in FIGS. 9 to 13 with the exception that sleeves 68.3 and 114.3 are split in a substantially similar manner as described for assembly 20.1 shown in FIGS. 5 to 8.

Figure 15:
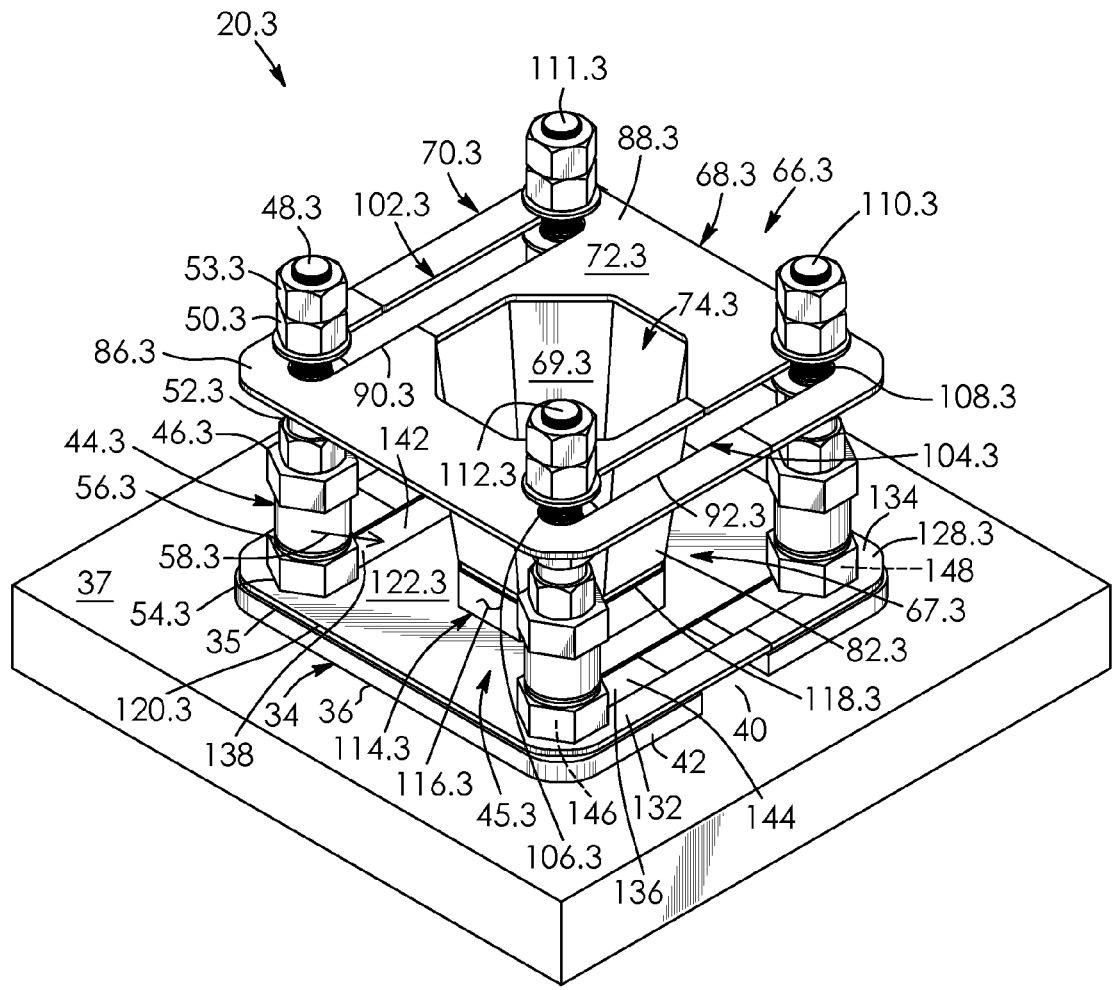
FIG. 15 is a top, side perspective view of the combination of FIG. 14, with the outer shell removed and showing a plurality of breakaway couplers operatively connected to the light pole, there also being shown a base plate and a sleeve assembly, the sleeve assembly includes an inner, upper sleeve positioned between the couplers and an inner, lower sleeve positioned between the couplers, each of the upper and lower sleeves comprising two split halves or parts.
Figure 16:
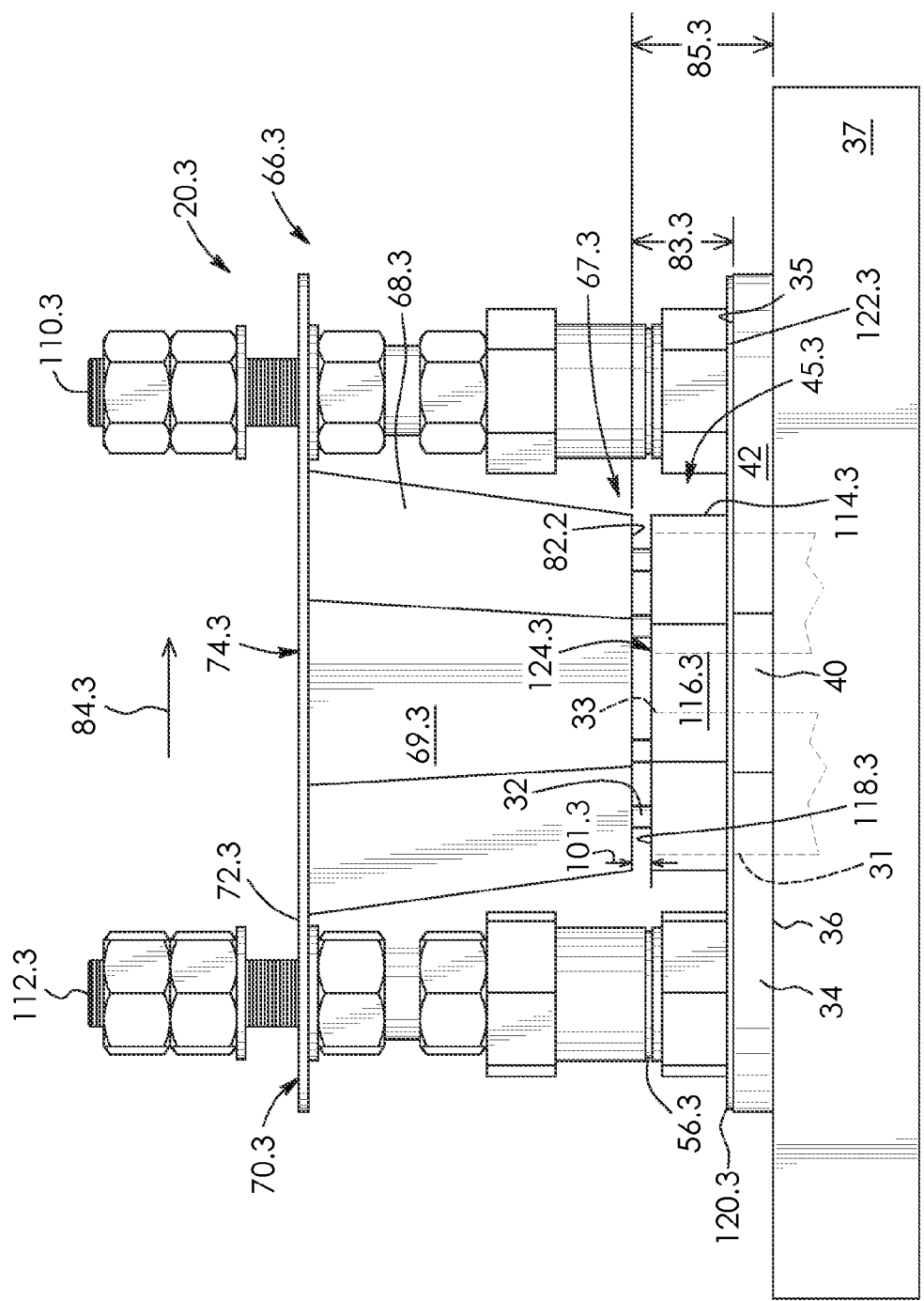
FIG. 16 is a side elevation view of the combination of FIG. 15, with the outer shell removed.
Figure 17:
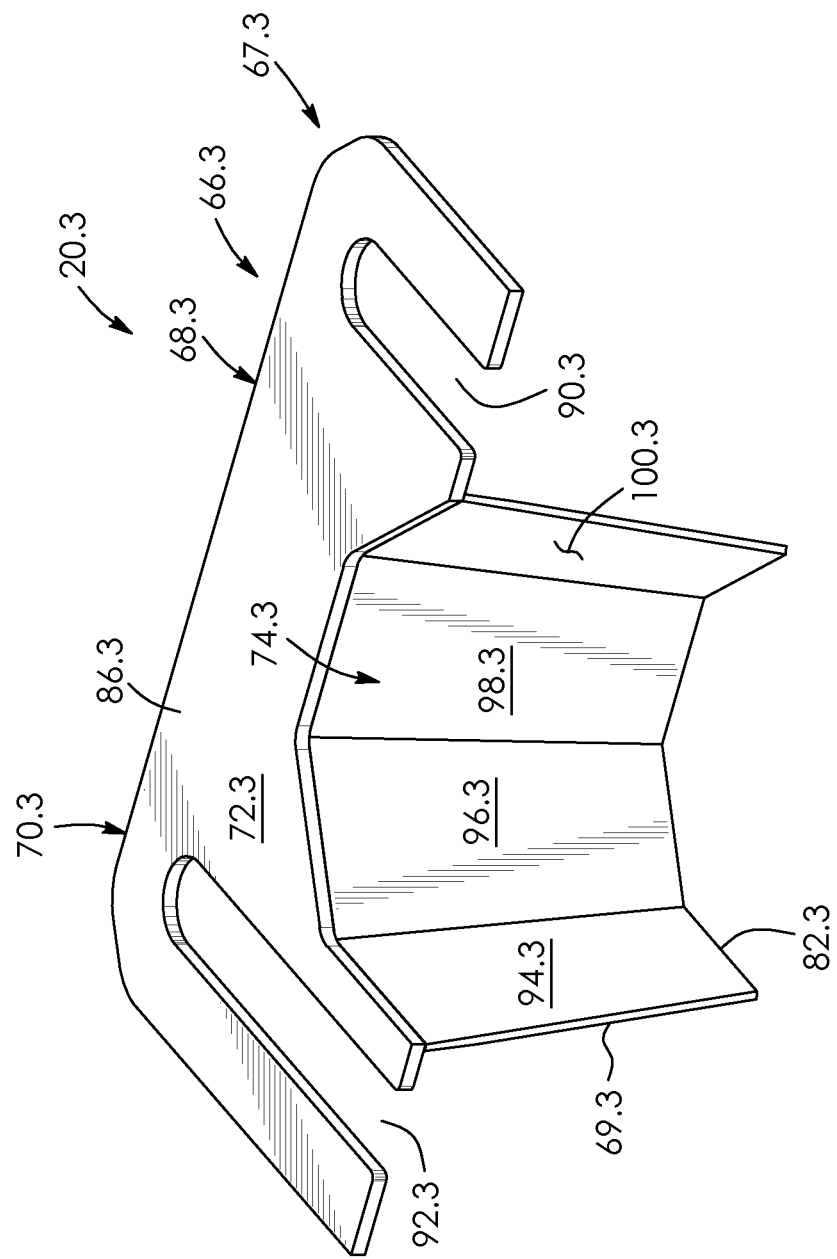
FIG. 17 is a top, side perspective view of the upper sleeve of FIG. 15.

As seen in FIG. 15, sleeve 68.3 is split and comprises two sleeve halves or parts 86.3 and 88.3, part 86.3 being shown in greater detail in FIG. 17. Each part has a pair of spaced-apart elongate recesses, as shown in this example by recesses 90.3 and 92.3 for part 86.3 of the sleeve. Each of the parts 86.3 and 88.3 has four elongate wall sections 94.3, 96.3, 98.3 and 100.3, each of which is connected to adjacent sections and angled relative thereto. The wall sections of each of the two parts of the sleeve when brought together enclose the cables and form a generally octagonal shape. Recess 92.3 is adjacent to wall section 94.3 and recess 90.3 is aligned adjacent to wall section 100.3. Recess 92.3 is longer than recess 90.3 by a distance equal to wall section 94.3 in this example.

As seen in FIG. 15, a pair of elongate slots 102.3 and 104.3 form when recesses 90.3 and 92.3 of the parts 86.3 and 88.3 of the sleeve 68.3 connect together. Each slot has a pair of spaced-apart ends, as shown by ends 106.3 and 108.3 for slot 104.3. A first two of the threaded members 110.3 and 112.3, extend through slot 102.3 and a second two of the threaded members 48.3 and 111.3, extend through slot 104.3. Sleeve 68.3 thereby operatively connects to the upper ends 46.3 of the couplers 44.3. Each threaded member abuts a respective one of the ends of the slots when the parts of the sleeve are brought together for enclosing around the cable, as shown by threaded members 112.3 and 110.3 abutting ends 106.3 and 108.3, respectively of slot 104.3.

Figure 18:
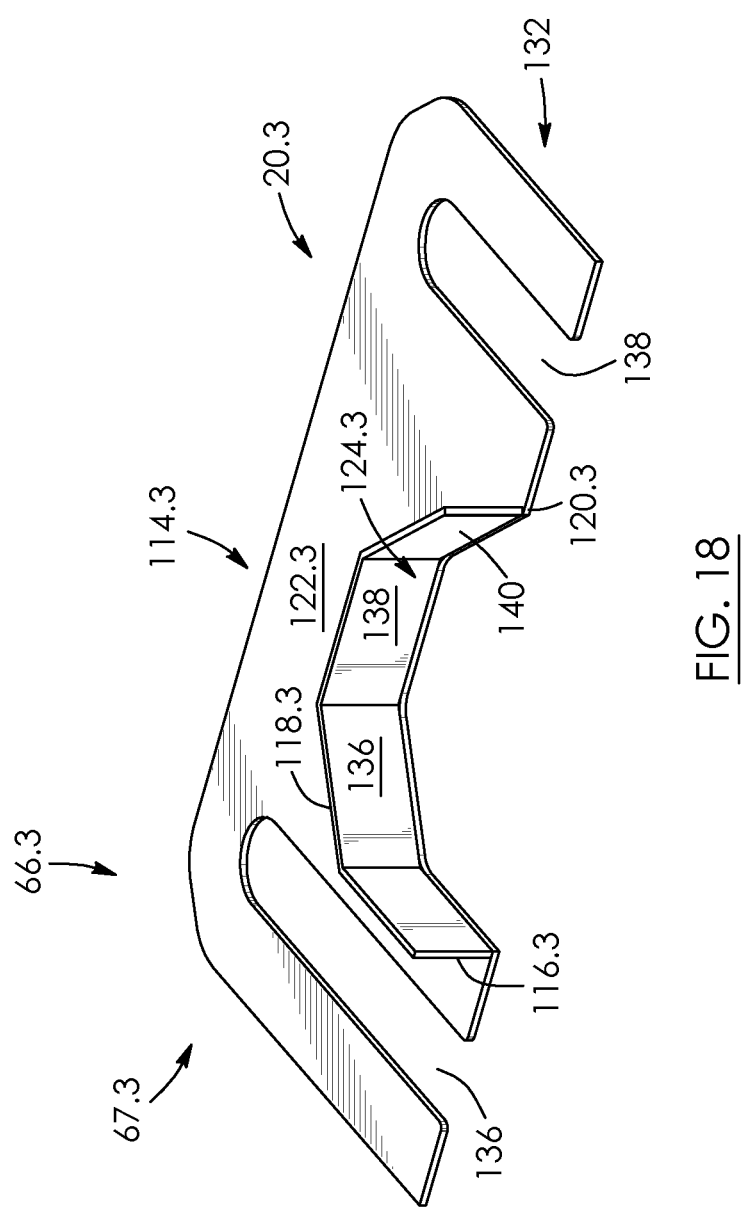
FIG. 18 is a top, side perspective view of the lower sleeve of FIG. 15.

As seen in FIG. 15, sleeve 114.3 is split and comprises two sleeve halves or parts 132 and 134, part 132 being shown in greater detail in FIG. 18. Each part has a pair of spaced-apart elongate recesses, as shown in this example by recesses 136 and 138 for part 132 of the sleeve. Each of the parts 132 and 134 has four elongate wall sections 116.3, 136, 138 and 140, each of which is connected to adjacent sections and is angled relative thereto. The wall sections of each of the two parts of the sleeve when brought together enclose the cable and form a generally octagonal shape. Recess 136 is adjacent to wall section 116.3 and recess 138 is aligned adjacent to wall section 140. Recess 136 is longer than recess 138 by a distance equal to wall section 116.3 in this example.

As seen in FIG. 15, a pair of elongate slots 142 and 144 form when recesses 136 and 138 of respective ones of the parts 132 and 134 of the sleeve 114.3 connect together. Each slot has a pair of spaced-apart ends, as shown by ends 146 and 148 for slot 144. Threaded members 110.3 and 112.3 extend through slot 144 and threaded members 48.3 and 111.3, extend through slot 142. Each threaded member abuts a respective one of the ends of the slots when the parts of the sleeve are brought together for enclosing around the cables.

Sleeves 68.3 and 114.3 as herein described may be particularly suited for existing installations where re-wiring of the light pole may not be possible or desired. The two sleeve parts 86.3 and 88.3 of sleeve 68.3 and the two sleeve parts 132 and 134 of sleeve 114.3 slide in from the sides between the couplers 44.3 and around the wires. Sleeves 68.3 and 114.3 in this split form may be installed without requiring the light pole to be lifted upwards. The light pole may be tiled by a small crane for example after loosening each of the nuts 50.3 and 53.3 from the threaded members 48.3, 110.3, 111.3 and 112.3. The next step is to slide in place one of the halves or parts of the sleeve 68.3, such as part 86.3, and one of the halves or parts of sleeve 114.3, such as part 134. The light pole may then be tilted in the opposite direction to slide in place the other half or part 88.3 of the sleeve 68.3 and the other half or part 132 of sleeve 114.3. Recesses 90.3 and 92.3 of the respective ones of the parts 86.3 and 88.3 of sleeve 68.3 and recesses 136 and 138 of the respective ones of the parts 132 and 134 of sleeve 114.3 enable the sleeves to be so positioned and slid in place.

The assemblies 66, 66.1, 66.2 and 66.3 as described herein may be collectively referred to as an anti-theft means for inhibiting access to and theft of the cable.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. In combination:
    a mounting assembly for an upright pole, the pole having a bottom and being supported by a foundation, at least one cable extending through said pole, the mounting assembly including a plurality of spaced-apart couplers each having a top end configured to connect to the bottom of the pole, a bottom end configured to connect to the foundation, and a breakaway point between the top and bottom ends of the couplers, the breakaway points promoting failure of the couplers threat when the pole is impacted by a vehicle, and the mounting assembly including a base plate; and
    an anti-theft assembly for inhibiting theft of the cable, the anti-theft assembly including an inner sleeve assembly shaped to extend about the cable, the sleeve assembly being robust and tamper-resistant, being positioned between the bottom of the pole and the foundation, the inner sleeve assembly having a lower end that is adjacent to the base plate and spaced-apart above the foundation so as to form a gap between the sleeve assembly and the foundation.

2. The combination as claimed in claim 1 wherein the sleeve assembly is fixedly connectable to the bottom of the pole.

3. The combination as claimed in claim 2 wherein the sleeve assembly comprises two parts longitudinally split in half that connect together when the parts of the sleeve assembly are connected to the bottom of the pole, with each of said parts of the sleeve assembly being configured to selectively slide in place when the pole is selectively tilted in opposite directions.

4. The combination as claimed in claim 1 wherein the sleeve assembly has an upper sleeve, the upper sleeve having an open, upper end operatively connected to the top ends of the couplers and the upper sleeve having an open, lower end spaced-apart from the upper end of the upper sleeve, the lower end of the upper sleeve being upwardly spaced-apart from the foundation.

5. The combination as claimed in claim 4, wherein the upper sleeve tapers inwardly from the upper end to the lower end thereof.

6. The combination as claimed in claim 1, wherein the sleeve assembly includes an upper sleeve having an open, lower end adjacent to and above the breakaway points of the couplers.

7. The combination as claimed in claim 1 wherein there is an inner space between the couplers, the sleeve assembly being located within said inner space.

8. The combination as claimed in claim 1 wherein the sleeve assembly includes an upper sleeve, the upper sleeve having an upper end and a flange at said upper end of the upper sleeve, the flange of the upper sleeve operatively connecting to the top ends of the couplers.

9. The combination as claimed in claim 8 wherein the flange has a plurality of spaced-apart apertures and wherein the mounting assembly further includes a plurality of threaded members that threadably connect the bottom of the pole to the top ends of the couplers, the threaded members extending through the apertures of the flange.

10. The combination as claimed in claim 8 wherein the flange has a pair of spaced-apart elongate slots, wherein the mounting assembly has four said couplers and wherein the mounting assembly further includes four threaded members that threadably connect the bottom of the pole to the top ends of the couplers, a first two of the threaded members extending through a first one of the slots of the flange, a second two of the threaded members extending through a second one of the slots of the flange, the upper sleeve connecting to the couplers.

11. The combination as claimed in claim 1, the mounting assembly further including an outer shell that extends outwardly about the couplers, the shell being frangible and having an open, first end adjacent to the foundation and an open, second end adjacent to the top ends of the couplers.

12. The combination as claimed in claim 1, the mounting assembly further including a plurality of connecting members that connect the couplers to the pole, and wherein the sleeve assembly comprises two parts, each of said parts having a pair of spaced-apart elongate recesses, the connecting members being shaped to extend through respective ones of the elongate recesses when the parts of the sleeve assembly are brought together for enclosing around the cable.

13. The combination as claimed in claim 1 wherein the sleeve assembly includes an upper sleeve, the upper sleeve having an open, upper end operatively connected to the top ends of the couplers and the upper sleeve having an open, lower end spaced-apart from the upper end of the upper sleeve, wherein the base plate is interposed between the foundation and the bottom ends of the couplers, and wherein the base plate has a central aperture with portions of the base plate adjacent to the aperture extending around the lower end of the upper sleeve, the lower end of the upper sleeve being upwardly spaced-apart from the base plate.

14. In combination:
a mounting assembly for an upright pole, the pole having a bottom and being supported by a foundation, at least one cable extending through said pole, the mounting assembly including a plurality of spaced-apart couplers each having a top end configured to connect to the bottom of the pole, a bottom end configured to connect to the foundation, and a breakaway point between the top and bottom ends of the couplers, the breakaway points promoting failure of the couplers thereat when the pole is impacted by a vehicle; and
an anti-theft assembly for inhibiting theft of the cable, the anti-theft assembly including an inner sleeve assembly shaped to extend about the cable, the sleeve assembly being robust and tamper-resistant, and the sleeve assembly including an upper sleeve that is operatively connectable to the bottom of the pole and a lower sleeve that is coupled to the foundation, the upper sleeve having a lower end that is adjacent to and spaced-apart above the lower sleeve so as to form a gap between the upper sleeve and the lower sleeve.

15. The combination as claimed in claim 14 wherein the upper sleeve has a lower end and the lower sleeve has an upper end adjacent to and spaced-apart from the lower end of the upper sleeve, a space thus being provided between the lower end of the upper sleeve and the upper end of the lower sleeve.

16. The combination as claimed in claim 14 wherein the upper sleeve has an open, lower end adjacent to and spaced-apart above the breakaway points of the couplers and wherein the lower sleeve has an upper end aligning with or below the breakaway points of the couplers.

17. The combination as claimed in claim 14 wherein the upper sleeve operatively connects to the couplers at locations above the breakaway points thereof, and wherein the lower sleeve operatively connects to the couplers at locations below the breakaway points of the couplers.

18. The combination as claimed in claim 14, wherein the gap aligns with the breakaway points of the couplers.

19. The combination as claimed in claim 14, wherein the gap is co-planar with the breakaway points of the couplers.

* * * * *